No. 684,526. Patented Oct. 15, 1901.
E. M. RANKIN.
RAILWAY CROSSING.
(Application filed Nov. 28, 1900.)
(No Model.)
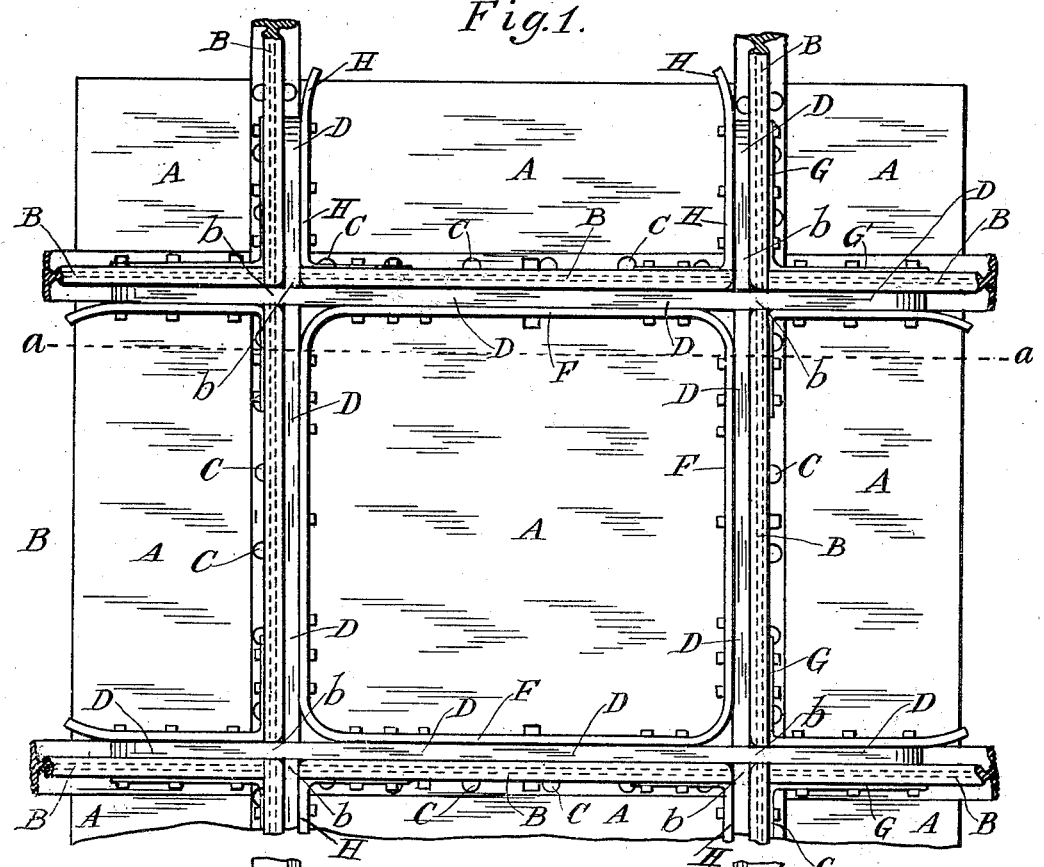
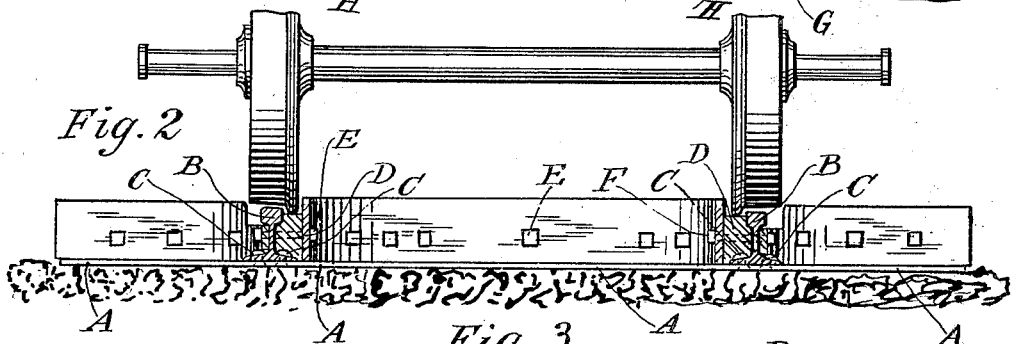
Witnesses  Inventor
  Edmund M. Rankin
By St. John Day.
  Attorney

UNITED STATES PATENT OFFICE.

EDMUND M. RANKIN, OF LOS ANGELES, CALIFORNIA.

RAILWAY-CROSSING.

SPECIFICATION forming part of Letters Patent No. 684,526, dated October 15, 1901.

Application filed November 28, 1900. Serial No. 37,990. (No model.)

*To all whom it may concern:*

Be it known that I, EDMUND M. RANKIN, of the city of Los Angeles, in the county of Los Angeles and State of California, have invented certain new and useful Improvements in Railway-Crossings, of which the following is a full, clear, and exact description or specification, reference being had to the annexed sheet of drawings and to the letters marked thereon.

My invention has for its object to so construct what are commonly known as "level-crossings" on railways—that is to say, crossing lines of rails on the same level, and in the rails of which notches or spaces have to be left to allow the flanges of the tires of the wheels of engines and cars or other vehicles traveling on railways to pass through while rolling over the crossing. Under the existing practically-used methods of construction and operating such crossings the body or tread of the tire rolls upon the top surfaces of the rails and considerable percussion, noise, and jolting of railway-vehicle wheels takes place every time a notch or recess in the rails is passed over.

The object of my present invention is to prevent this percussion, noise, and jolting while the wheels of railway-vehicles are passing over the notches or recesses therein, so that smooth and continuous rolling without percussion, noise, and jolting is produced by means of my improved crossings.

Figure 1 is a plan of a crossing consisting of two lines of railway at right angles to each other. Fig. 2 is a transverse section of the same on the line *a a*, Fig. 1, and showing the axle and lower part of a pair of wheels passing over or through the crossing. Fig. 3 is a detail hereinafter more fully described.

From Figs. 1 and 2 it will be seen that all the parts constituting the entire crossing are firmly fastened down to a flat iron or steel plate A. The main-line rails are all marked B B B B, &c., in all the figures, and these are riveted or bolted down to the metallic plate A by rivets or bolts C, several of which are so marked in the drawings. The notches marked *b b b* in Fig. 1 represent the spaces or recesses in the lines of rails for the flanges of the tires to pass through, and which spaces or recesses are the cause of the percussion, noise, and jolting of the wheels of railway-vehicles when passing over them, as hereinbefore referred to.

Under my present invention I change the rolling-surfaces of the wheels from the cylindrical body or tread of the tires to the flanges of the tires during the time that any one or more railway-vehicle wheels are passing over or through the crossing, so that the cylindrical part or tread of the tires does not touch the rails during the time the wheels are passing through the crossing, but the tires are supported and rolled upon a continuous level surface on that side of the rails whereat the flanges of the tires are situated. The device whereby I effect this transference of the rolling-surfaces of the wheels from the cylindrical body to the flange in passing the crossing consists in what I prefer to call "easel-bars" D, secured to the inner side, one of which is rigidly secured to the inner side of each of the rails of both lines of railway. These easel-bars, as seen in the transverse section, Fig. 2, are so shaped as to fit in against the inner side of the rails B B B, as shown more especially in the section Fig. 2, and these easel-bars are firmly bolted by bolts E passing through them, through the rails, through the inner guard-rails F, which are formed of a square frame of iron or steel with rounded corners, as shown at Fig. 1, and through the angle-pieces G and outer guards H, also shown at Fig. 1, whereby all of the parts are rigidly held together while being solidly united or bolted down to the plate A. As will be seen on examining Fig. 2 of the drawings more especially, the upper surface of the easel-bars D D D is but slightly lower than the upper surface of the tables of the rails B B—say one-fourth of an inch—while the height of the inner guard-rails F is higher than the top surfaces of the rails B B, (about three-fourths of an inch,) so that while the flange of the tire is rolling upon the easel-bars D D D the wheels are prevented from leaving the track proper by the height of the guard-rails D D D, while the spaces between the top of the rails B and the inner face of the guard-rails F are ample to allow freedom for lateral motion of the wheels while passing over the crossing, and the corners of the guard-rails being rounded, as shown at Figs. 1 and 2, as well as the corners of the spaces and recesses of the rails b b, as shown in Fig. 1, enables the wheels while rolling on their flanges through the crossing to pass over or through the same without any tendency to mount the rail or become derailed. The ends of the easel-bars are gradually curved and inclined, as shown more particularly in the larger view, Fig. 3, so that the wheels on coming in contact with the easel-bars gradually ascend to the highest level of the easel-bars and as gradually descend from the opposite end of the easel-bars when the crossing has been passed over.

Having now described the nature of my said invention and the best system, mode, or manner I am at present acquainted with for carrying the same into practical effect, I desire to observe in conclusion that what I consider to be novel and original and therefore claim as the invention, to be secured to me by Letters Patent, is as follows:

A railroad-crossing consisting of the combination of rails with "easel-bars" crossing each other, and a guard-rail of greater height than the main-line rails, said guard-rail being a square metallic frame with rounded corners—the rails which cross each other and the "easel-bars" also the guard-rail frame and the external part of the guard-rails being bolted through and through so that with the external angle-pieces also bolted to the rails and "easel-bars" the entire combination of parts constitute a device which lifts the cylindrical tread of the wheels off the main-line rails, and transfers the rolling load to the "easel-bars" and flanges of the tires, as the rolling load passes over the crossing, the whole being riveted and securely fastened to a flat plate which constitutes an integral part of the device for retaining all the parts thereof in their proper operative relationship, in or with railroads which cross each other with the results substantially as hereinbefore described.

In witness whereof I have hereunto set my hand and seal, this 13th day of September, 1900, in the presence of two subscribing witnesses.

EDMUND M. RANKIN. [L. S.]

Witnesses:
ST. JOHN DAY,
THEO. A. EISEN.